United States Patent
Smith

(10) Patent No.: US 9,833,689 B2
(45) Date of Patent: Dec. 5, 2017

(54) MODULAR CONNECTOR SYSTEM

(71) Applicant: Jeffrey T. Smith, Webster, NY (US)

(72) Inventor: Jeffrey T. Smith, Webster, NY (US)

( * ) Notice: Subject to any disclaimer, the term of this patent is extended or adjusted under 35 U.S.C. 154(b) by 254 days.

(21) Appl. No.: 14/540,659

(22) Filed: Nov. 13, 2014

(65) Prior Publication Data
US 2015/0139718 A1 May 21, 2015

Related U.S. Application Data

(60) Provisional application No. 61/904,818, filed on Nov. 15, 2013.

(51) Int. Cl.
*A63C 19/08* (2006.01)
*A63C 19/10* (2006.01)
*E04H 17/16* (2006.01)

(52) U.S. Cl.
CPC .............. *A63C 19/10* (2013.01); *A63C 19/08* (2013.01); *E04H 17/16* (2013.01); *A63C 2019/085* (2013.01); *A63C 2203/10* (2013.01); *Y10T 403/42* (2015.01)

(58) Field of Classification Search
CPC .............. F16C 11/0638; F16C 11/0642; F16C 11/0614; F16C 11/0671; A63C 19/08; A63C 19/10; A63C 2019/085; A63C 2203/10; E04B 2/8614; E04B 2/8635; E04B 2/8617; E04G 11/08; E04H 17/16; E04H 17/165; E04H 17/166; E04H 17/168; E04H 17/18; E04H 2017/1447; Y10T 403/42; Y10T 403/7096; Y10T 403/72; Y10T 403/725; Y10T 403/73

USPC ....... 403/122, 133, 135, 123, 134, 205, 382, 403/401–403, DIG. 15; 384/49; 277/634, 277/635, 636; 256/24, 31, 73; 248/678; 52/781.5, 578, 581
See application file for complete search history.

(56) References Cited

U.S. PATENT DOCUMENTS

| | | | |
|---|---|---|---|
| 2,996,896 A | 1/1956 | Johnson | |
| 3,012,596 A | 3/1959 | Skolout | |
| 3,721,418 A | 3/1973 | Vincent | |
| 3,797,049 A | 3/1974 | DeSanto | |
| 3,808,831 A | 5/1974 | Landry | |
| 5,134,857 A | 8/1992 | Burley | |
| 5,154,837 A * | 10/1992 | Jones | E04G 9/08 249/134 |
| 5,562,272 A * | 10/1996 | McAbee | E01C 19/502 249/192 |
| 5,622,021 A * | 4/1997 | Bookout | E04H 3/14 256/31 |
| 5,771,706 A | 6/1998 | Lavigne | |

(Continued)

FOREIGN PATENT DOCUMENTS

CA    2777394 A1 * 11/2013 ............ A63C 19/10

*Primary Examiner* — Josh Skroupa
(74) *Attorney, Agent, or Firm* — Bond, Schoeneck & King, PLLC; Joseph Noto

(57) ABSTRACT

A modular connector system for facilitating the construction of a playing area or non-playing area, such as an outdoor or backyard ice hockey or skating rink, a netted or lighted area, sand box, garden, and the like. Spanning boards and/or inserted poles can be used to join side connectors to corner connectors and to side connectors to form a free standing, fully enclosed, partially enclosed, walled-in, netted, or partitioned area.

13 Claims, 13 Drawing Sheets

(56) References Cited

U.S. PATENT DOCUMENTS

| | | | | |
|---|---|---|---|---|
| 5,820,470 A * | 10/1998 | Saunders | A63C 19/00 | 256/25 |
| 5,870,873 A | 2/1999 | Dahlin et al. | | |
| 5,897,438 A * | 4/1999 | Kunz | A63C 19/00 | 472/90 |
| 6,004,218 A * | 12/1999 | Keating | A63C 19/06 | 256/24 |
| 6,095,503 A * | 8/2000 | Burley | A63C 19/06 | 256/24 |
| 6,186,379 B1 * | 2/2001 | Haage | B60R 7/02 | 220/9.4 |
| 6,230,451 B1 * | 5/2001 | Stoller | A63C 19/10 | 220/9.4 |
| 6,327,864 B1 * | 12/2001 | Crowe | A63C 19/10 | 472/92 |
| 6,517,442 B1 * | 2/2003 | Post | A63C 19/10 | 256/25 |
| 6,629,681 B1 * | 10/2003 | Miller | E01C 19/502 | 249/13 |
| 6,866,589 B1 * | 3/2005 | Widrick | A63C 19/10 | 472/90 |
| 7,131,624 B2 * | 11/2006 | Bogrett | A01G 1/08 | 249/213 |
| 7,849,653 B2 * | 12/2010 | Guertin | A63C 19/06 | 472/94 |
| 2005/0049086 A1 * | 3/2005 | Pavicich | A63B 67/066 | 473/415 |
| 2005/0066677 A1 * | 3/2005 | Beynon | A63C 19/10 | 62/235 |
| 2005/0075178 A1 * | 4/2005 | Widrick | A63C 19/10 | 472/90 |
| 2007/0021241 A1 * | 1/2007 | Geller | A63B 63/004 | 473/415 |
| 2009/0049785 A1 * | 2/2009 | Guertin | A63C 19/06 | 52/581 |
| 2009/0137329 A1 * | 5/2009 | Palumbo | A63C 19/10 | 472/94 |
| 2011/0218047 A1 * | 9/2011 | Kessler | A63C 19/00 | 472/89 |
| 2011/0275457 A1 * | 11/2011 | Roedel | A63C 19/00 | 473/415 |
| 2012/0304564 A1 * | 12/2012 | Kurczynski | E02D 27/04 | 52/293.3 |

\* cited by examiner

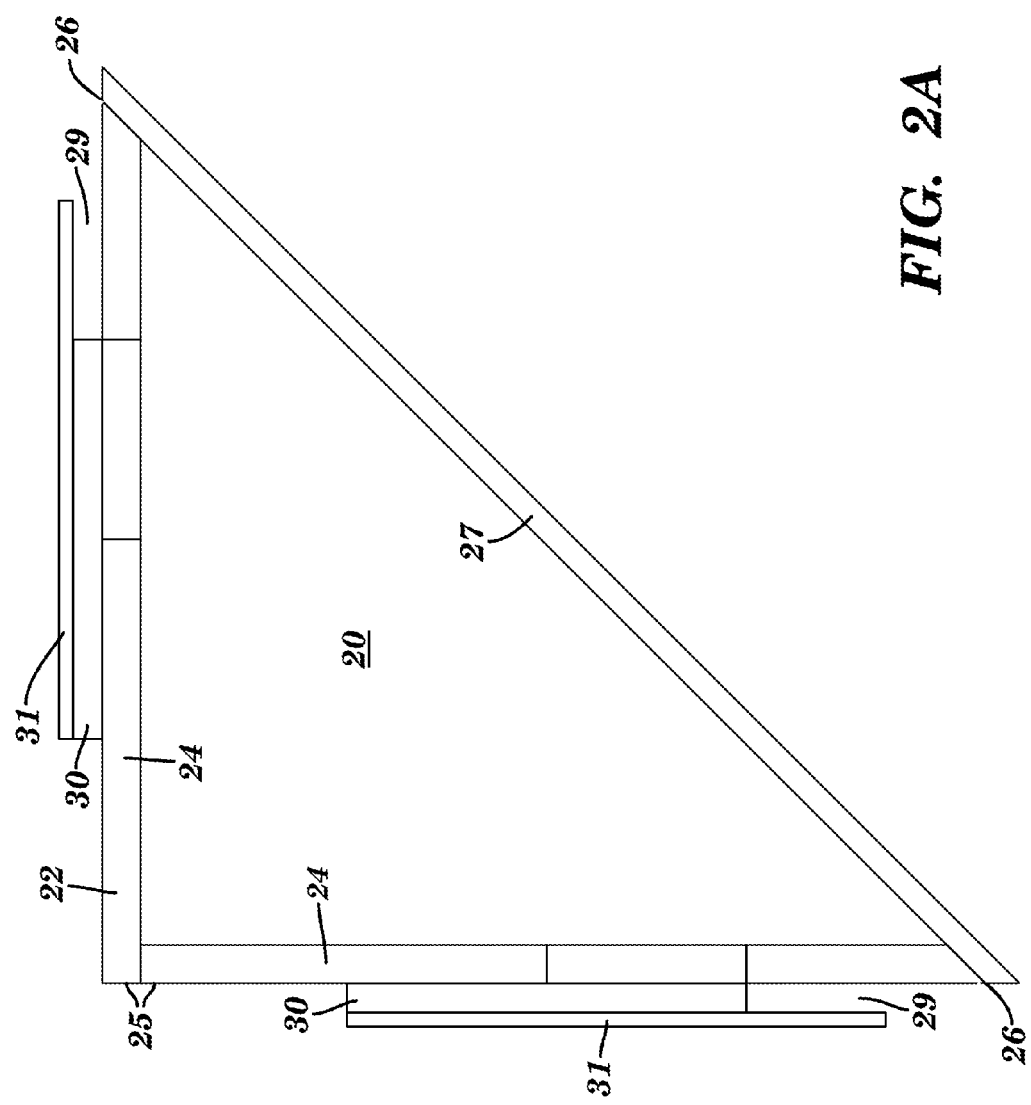

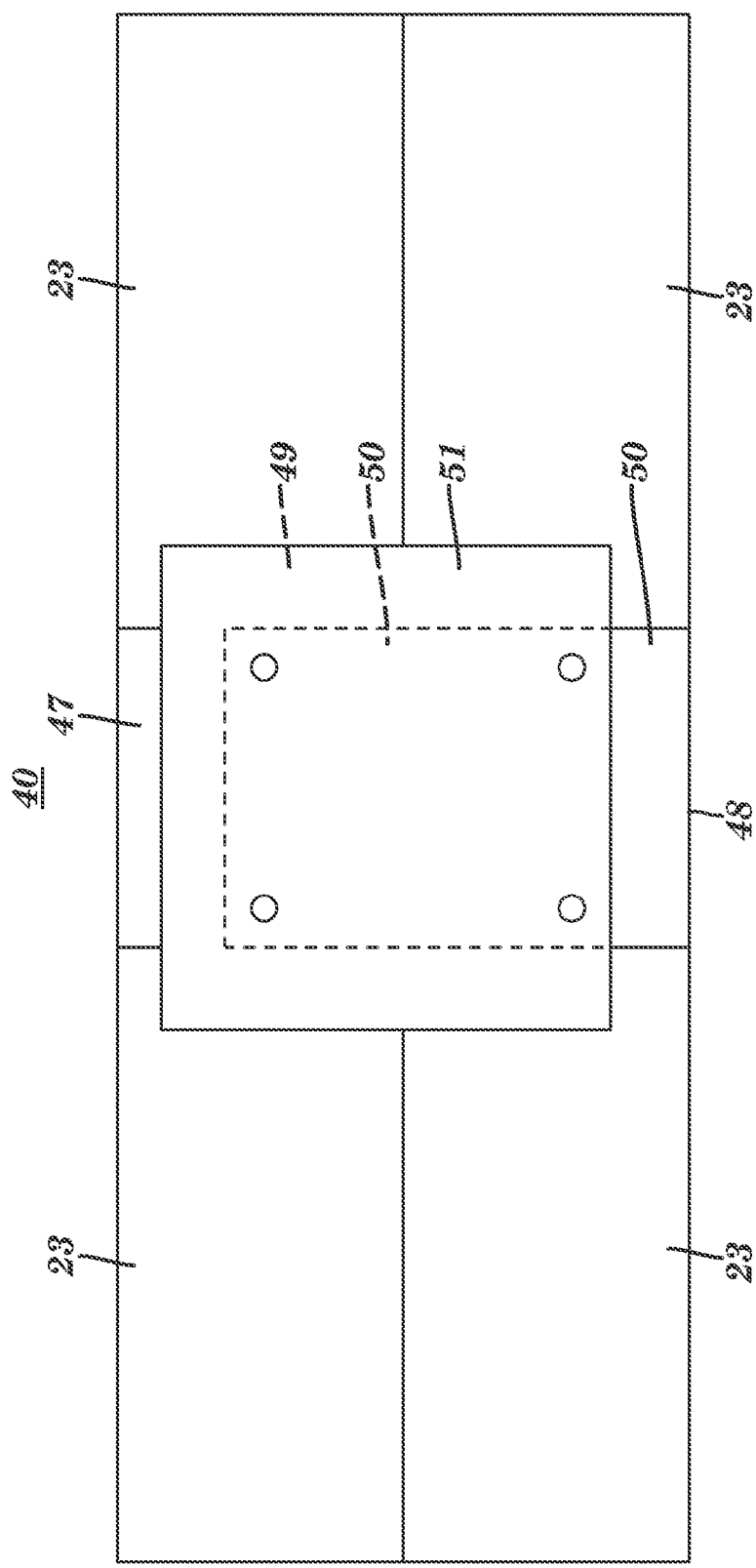

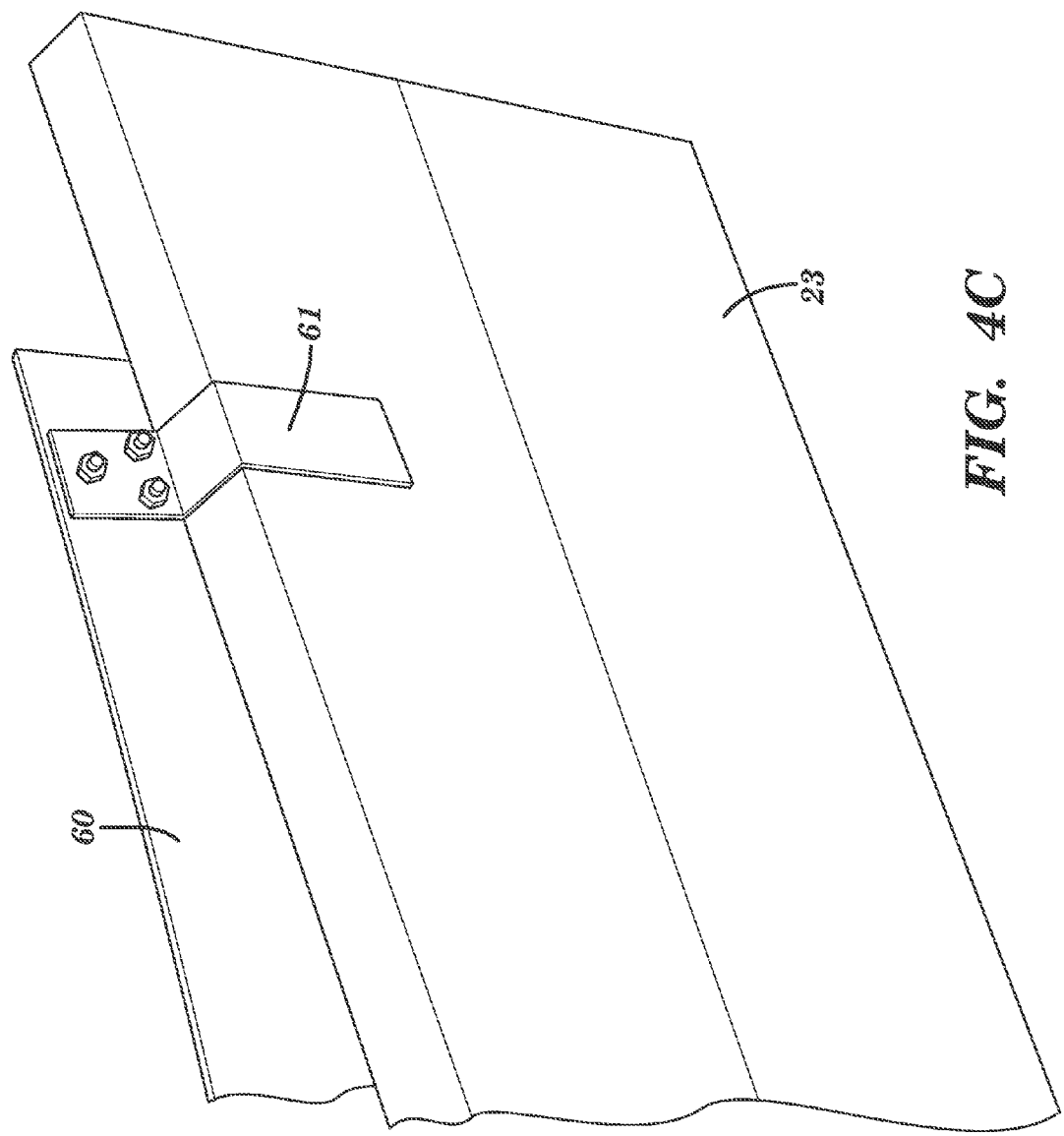

MODULAR CONNECTOR SYSTEM

CROSS REFERENCE

This application claims the benefit of the filing date of U.S. Provisional Patent Application Ser. No. 61/904,818, filed Nov. 15, 2013, which is hereby incorporated by reference in its entirety.

FIELD

The present invention relates to a modular system, and more particularly to a modular connector system, such as a modular rink system that can be assembled from modular components for seasonal use.

BACKGROUND

Backyard ice rinks have been traditionally fraught with challenges associated with the time, expense and know-how to construct these complicated, large scale projects, uneven lawn grades requiring high water/ice lines in low spots and therefore greater pressure and limited board space above the ice line in those areas, uncooperative weather conditions, and holes and rips in plastic liners putting an early end to the season. It's a daunting, trial and error process that can frustrate even the most diehard do-it-yourselfer.

There is a need for a modular, easy to assemble/disassemble connector system that allows for construction of outdoor rinks of varying size using boards purchased at the local lumber store, which can withstand extreme forces of weight and pressure associated with water, ice, snow, multiple persons engaged in sport, and heavy machines like snow blowers.

There is a need for a modular connector system that can easily accommodate uneven lawn grades and provide a better playing area by allowing stacking of boards to create higher walls and therefore more board space above the ice line in low, deep water areas.

There is a need for a modular connector system component that can easily create a more realistic, rink shaped playing surface while also protecting against liner rips and tears.

There is a need for a modular connector system component that will easily provide for securing the liner to the outer boards without the use of staples, clamps or other means. Additionally, there is a need for a modular connecting system having a component design that incorporates an insertion point for light/net poles.

SUMMARY

In accordance with one aspect of the present invention, there is provided a modular connector system including four corner connectors, each corner connector adapted to rest on the ground and include a base having two side members positioned at approximately right angles to each other and perpendicular to the ground, wherein each of the two side members includes a frictional slot perpendicular to the ground, each frictional slot configured to receive an end of a horizontally positioned spanning board or set of horizontally positioned vertically stacked spanning boards via top installation so that the spanning board or set of spanning boards in one of the two side member slots is at approximately right angles to the spanning board or set of spanning boards in the other one of the two side member slots; at least two side connectors, each side connector adapted to rest on the ground and include a base having one side member perpendicular to the ground, wherein the side member includes two frictional slots along a substantially linear path to one another and perpendicular to the ground, the frictional slots configured to receive an end of a horizontally positioned spanning board or set of horizontally positioned vertically stacked spanning boards via top installation so that the spanning board or set of spanning boards in one of the two side member slots is positioned along a substantially linear path to the spanning board or set of spanning boards in the other one of the two side member slots; wherein at least two separate pairs of corner connectors are joined to each other by at least one of a spanning board-side connector-spanning board segment to form an enclosed area.

In accordance with another aspect of the present invention, there is provided a corner connector including a base having a stabilizing footprint which enables the corner connector to rest securely on the ground, the base including at least two side members perpendicular to the ground positioned at approximately right angles to one another, each of the two side members having a vertical frictional slot configured to receive an end of a horizontally positioned spanning board or ends of a set of horizontally positioned vertically stacked spanning boards via top installation so that the spanning board or set of spanning boards in one of the two side member slots is at approximately right angles to the spanning board or set of spanning boards in the other one of the two side member slots.

In accordance with another aspect of the present invention, there is provided a side connector including a base having a stabilizing footprint which enables the side connector to rest securely on the ground, the base including one side member perpendicular to the ground, wherein the side member includes two frictional slots along a substantially linear path to one another and perpendicular to the ground, the frictional slots configured to receive an end of a horizontally positioned spanning board or set of horizontally positioned vertically stacked spanning boards via top installation so that the spanning board or set of spanning boards in one of the two side member slots is positioned along a substantially linear path to the spanning board or set of spanning boards in the other one of the two side member slots.

These and other aspects of the present invention will become apparent upon a review of the following detailed description and the claims appended thereto.

BRIEF DESCRIPTION OF THE DRAWINGS

The advantages and features of this invention will be readily apparent from the detailed description when taken in conjunction with the accompanying drawings in which:

FIG. 2A is a top plan view of a corner connector.

FIG. 3D is a front view of the hypotenuse side of a side connector with spanning boards in accordance with an embodiment of the present invention;

DETAILED DESCRIPTION

Figure 1:
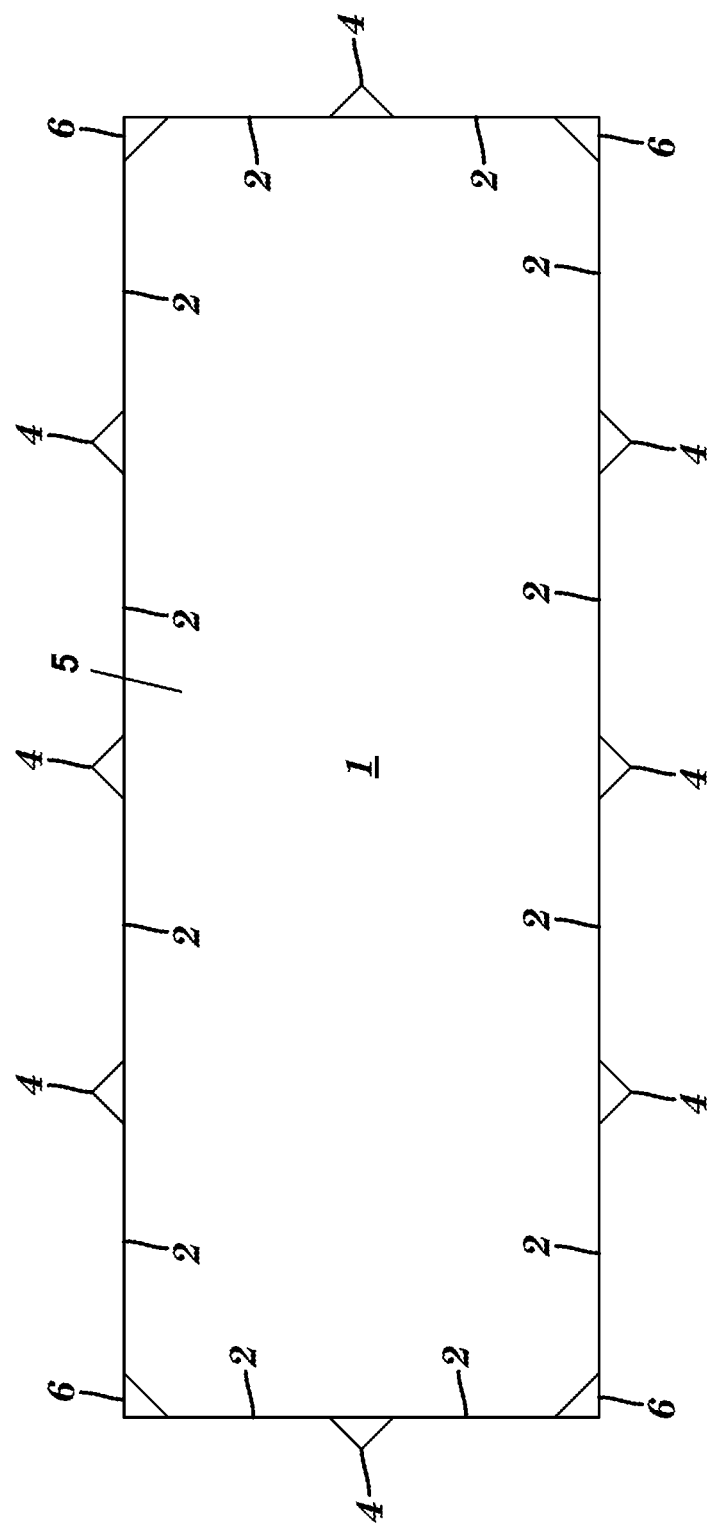
FIG. 1 is a schematic of a top view illustrating a modular rink system in accordance with an embodiment of the present invention.
Figure 2B:
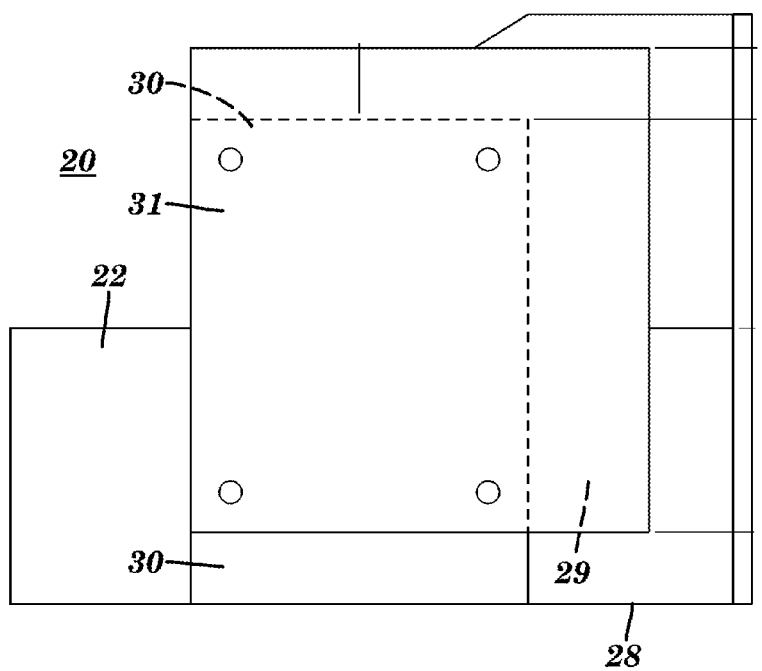
FIG. 2B is front view of one side of a corner connector.
Figure 2C:
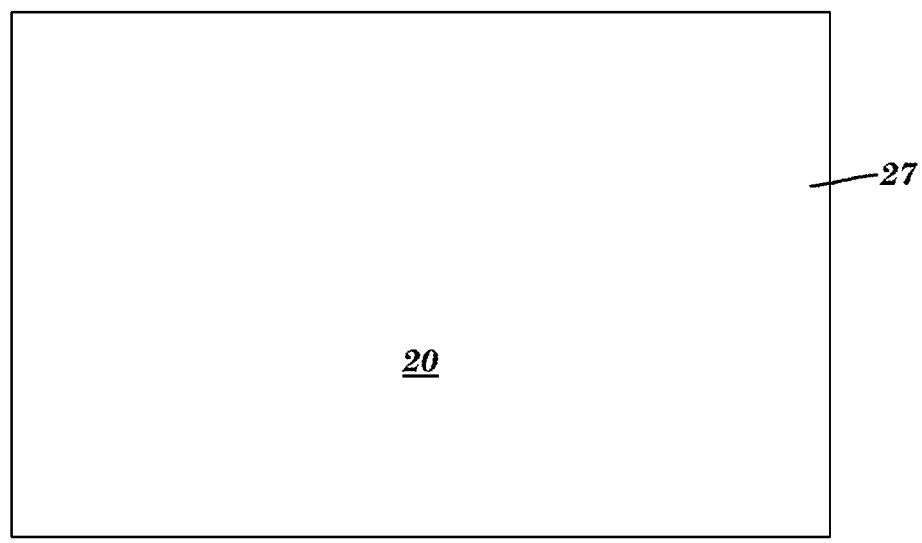
FIG. 2C is a front view of the hypotenuse side of a corner connector.
Figure 2D:
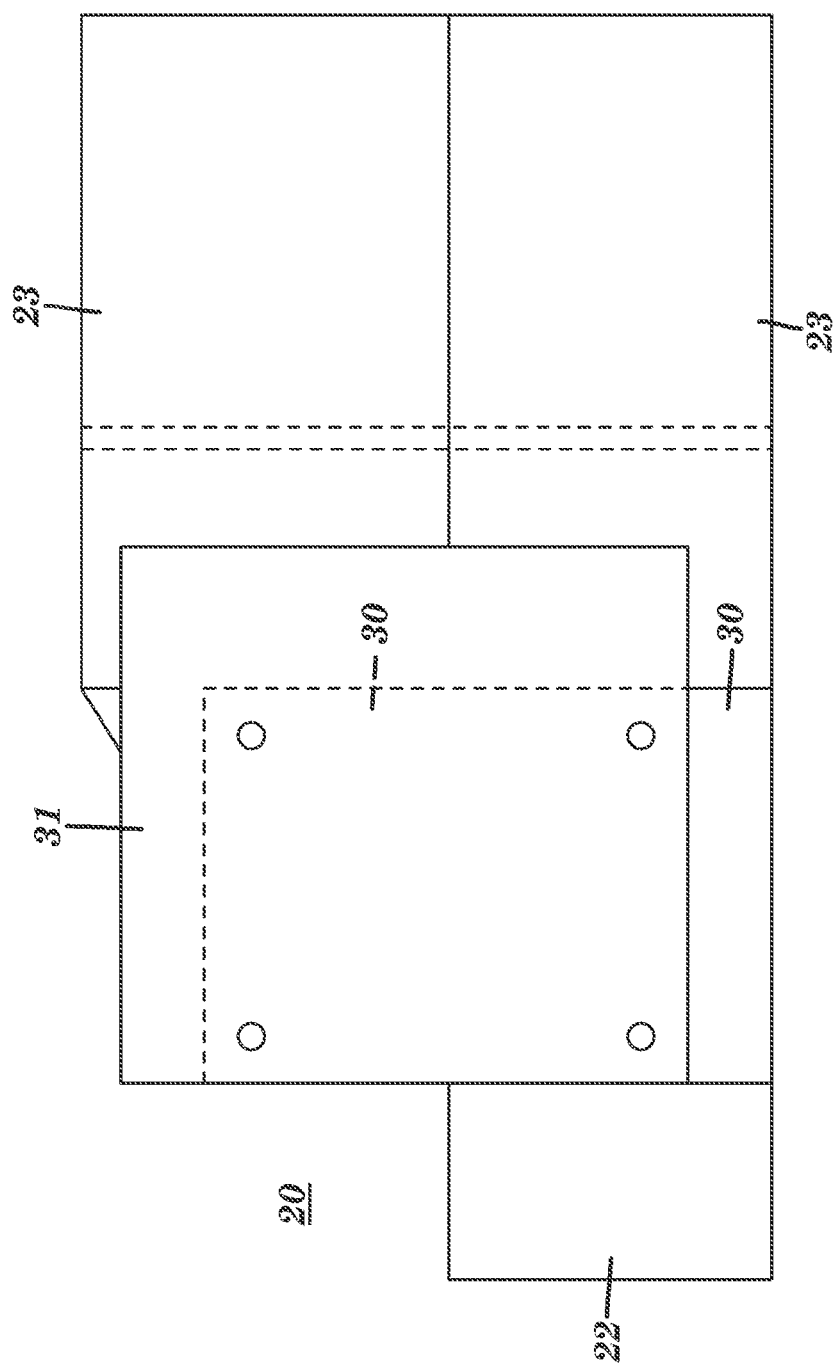
FIG. 2D is a front view of one side of a corner connector with spanning boards, in accordance with an embodiment of the present invention.
Figure 3A:
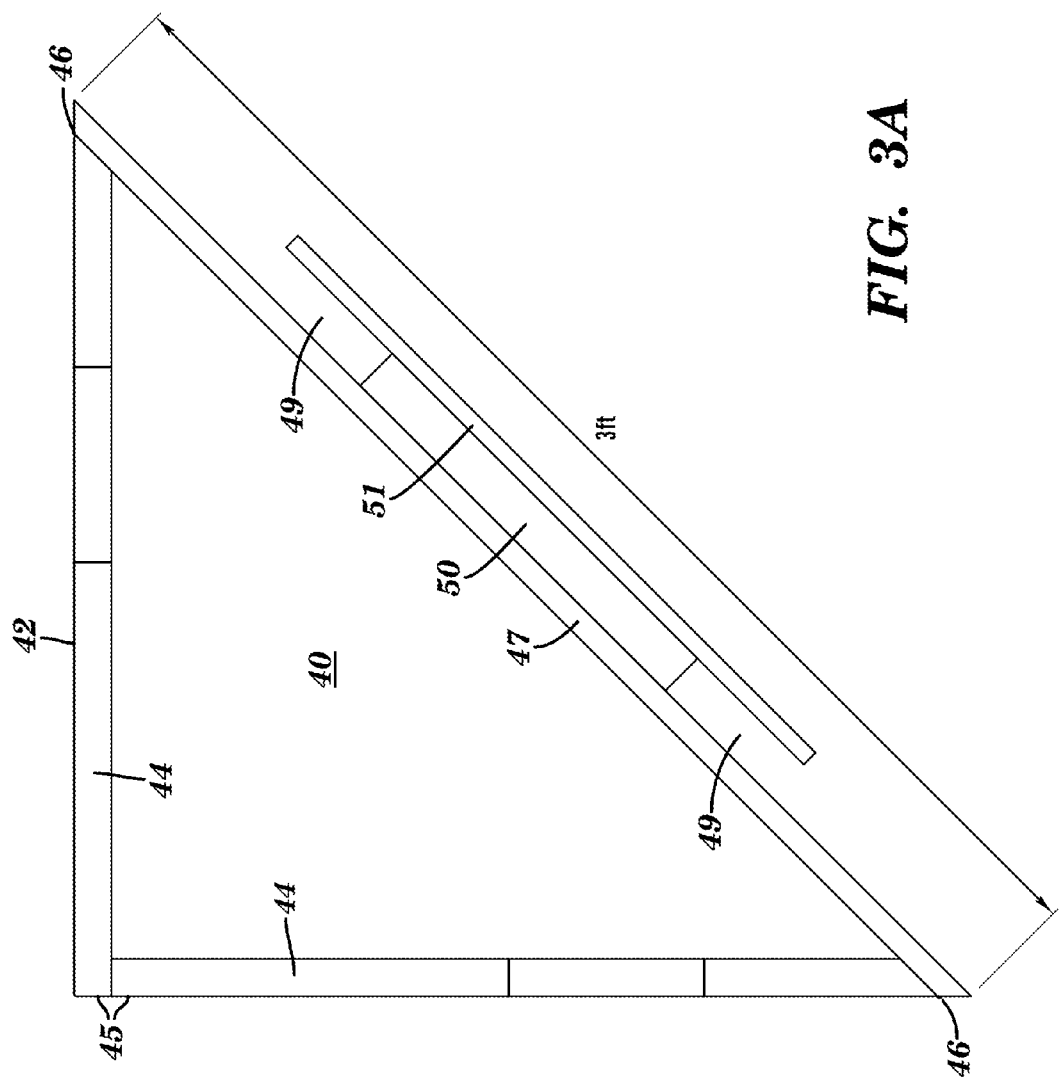
FIG. 3A is a top plan view of a side connector.
Figure 3B:
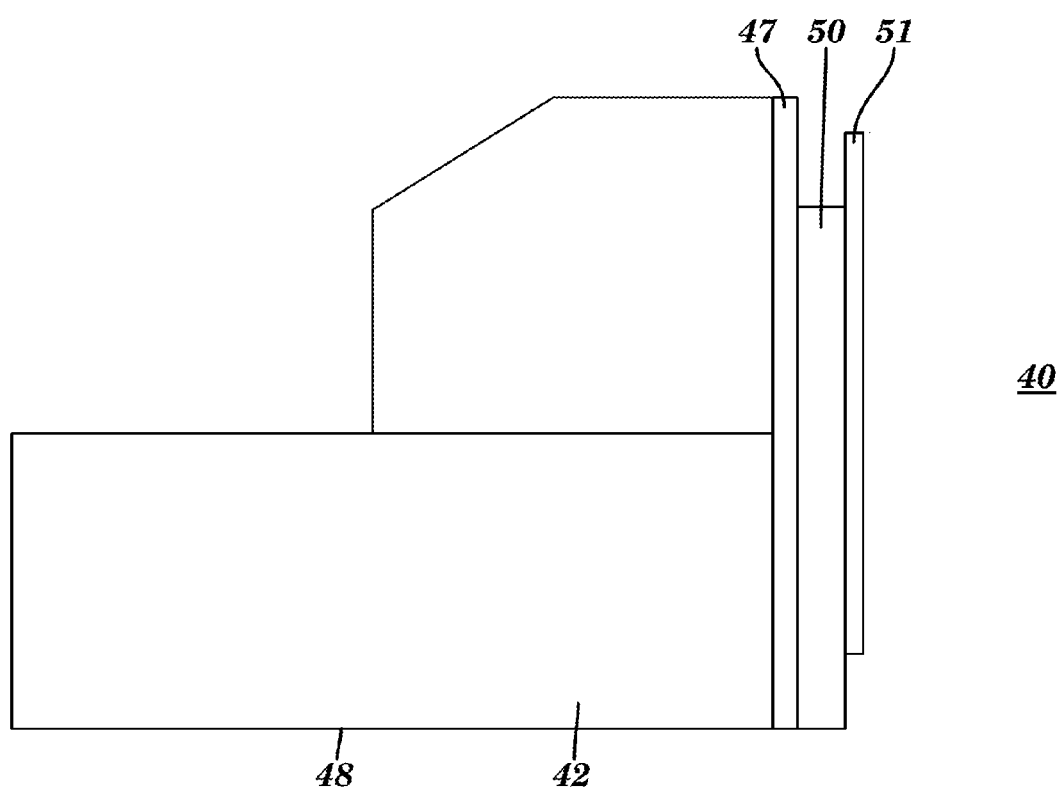
FIG. 3B is a front view of one side of a side connector.
Figure 3C:
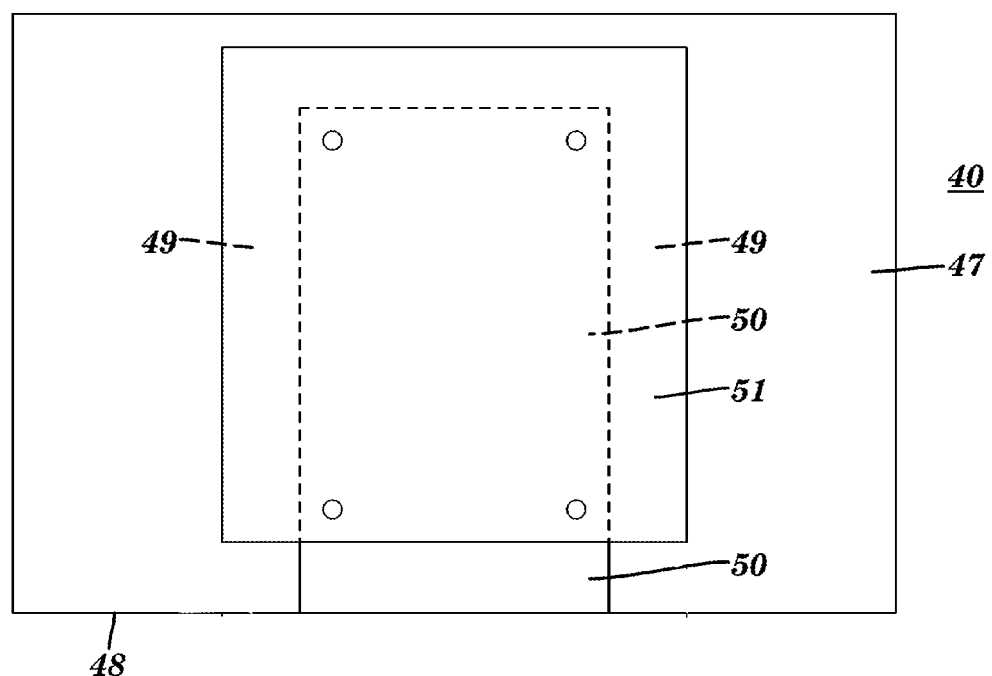
FIG. 3C is a front view of the hypotenuse side of a side connector.

The present invention relates to a modular connector system, such as a modular board connecting and stacking system, for facilitating the construction of a playing area or non-playing area, such as an outdoor or backyard ice hockey or skating rink, sand box, garden, fully enclosed, partially enclosed, walled-in, netted, partitioned area, and the like. The modular system includes modular components which can be connected, for example, to form a rink. The modular components include free-standing corner connectors and free-standing side connectors. Spanning boards can be used to join the side connectors to the corner connectors and other side connectors.

The corner connector includes a base having a stabilizing footprint which enables the corner connector to rest securely on the ground. The base can take any shape capable of resting securely on the ground, such as for example, a triangle, square, trapezoid, rectangle, or the like. The connector base can be formed using multiple pieces (or members) or could be a single piece formed from a mold. For purposes of the ensuing discussion, "side member" could be used interchangeably with "side".

In one embodiment, the corner connector base is formed of three side members joined together end to end in the form of a triangle. Each side member can have four ends. For example, two side members can be connected at right angles to each other by ends and joined to opposing ends of the third side member in a hypotenuse orientation. The hypotenuse side member can be planar or curved. The side member can have two rectangular surfaces, each surface connected by four ends. The triangle base is preferably positioned such that one exposed side end of each side member is in contact with the ground. The connector base components can take any form, such as planks, boards, injection molding, welded frame, and the like and be made from any combination of suitable materials, such as, wood, plastic, metal, composites, rubber, and the like. In an embodiment, the base is provided with a cut-out portion such as a void or cavity, which functions as a handle to facilitate ease of handling.

In an embodiment, the corner connector is configured to receive the end of a horizontally positioned spanning board or set of horizontally positioned vertically stacked spanning boards via top installation in respective frictional slots on each of two side members positioned at approximately right angles to one another. As noted above, the corner connector can be any shape preferably having two sides at approximately right angles to each other with a frictional slot on each side. The corner connector can be sized to accommodate a plurality of horizontally positioned vertically stacked spanning boards as desired.

Each frictional slot is bordered on three vertical sides (two side and one back) and open on the top, bottom, and remaining fourth vertical side (front). The back side acts as a vertical "stop" for incoming spanning boards.

In one embodiment, the frictional slots can be formed by a mounting/stop member or members attached to the surface of each of two side members positioned at approximately right angles to each other, and a clamping member attached to each mounting/stop member(s). In this embodiment, the thickness of the mounting/stop member(s) is approximately the same thickness of the spanning board and having sufficient clearance for the spanning board to be placed in the slot from the top. In this embodiment, the mounting/stop and/or clamping members are detachably fastened to each side member, for example by bolts, screws and the like, in a manner to clamp the spanning board in the frictional slot. The mounting/stop and clamping members can be any suitable combination of form and material, such as planks, boards, metal tubes or plates, rubber or plastic.

In another embodiment, the frictional slots or the backside stop/mounting member(s)can be formed by being built right into each of two side members positioned at approximately right angles to one another, through injection molding, welded, formed, or other manners.

In another embodiment, the frictional slots can be formed by a single member, such as a molded piece of plastic, or formed or extruded metal, detachably clamped to each of two side members positioned at approximately right angles to one another, by bolts or other manners which can be tightened after the spanning board or set of spanning boards have been inserted into the frictional slot.

In any embodiment, the corner connector allows the horizontally positioned spanning board or boards to stand firmly upright and evenly, vertically stacked once inserted in the frictional slots.

As with the corner connector, the side connector includes a base having a stabilizing footprint which enables the side connector to rest securely on the ground. The base can take any shape capable of resting securely on the ground, such as for example, a triangle, square, trapezoid, rectangle, or the like. The connector base can be formed using multiple pieces (or members) or could be a single piece formed from a mold. For purposes of the ensuing discussion, "side member" could be used interchangeably with "side".

In one embodiment, the side connector base is formed of three side members joined together end to end in the form of a triangle. Each side member can have four ends. For example, two side members can be connected at right angles to each other by ends and joined to opposing ends of the third side member in a hypotenuse orientation. The side member can have two rectangular surfaces, each surface connected by four ends. The triangle base is preferably positioned such that one exposed side end of each side member is in contact with the ground. The connector components can take any form, such as planks, boards, injection molding, welded frame, and the like and be made from any suitable material, such as, wood, plastic, metal, composites, rubber, and the like. In an embodiment, the base is provided with a cut-out portion such as a void or cavity, which functions as a handle to facilitate ease of handling.

In an embodiment, the side connector is configured to receive the end of a horizontally positioned spanning board or set of horizontally positioned vertically stacked spanning boards via top installation in respective frictional slots positioned on the same side member along a substantially linear path to one another. As noted above, the side connector can be any shape preferably having one side which includes respective frictional slots positioned along a substantially linear path to one another. The side connector can be sized to accommodate a plurality of horizontally positioned vertically stacked spanning boards as desired.

Each frictional slot is bordered on three vertical sides (two side and one back) and open on the top, bottom, and remaining fourth vertical side (front). The back side acts as a vertical "stop" for incoming spanning boards.

In one embodiment, the frictional slots can be formed by a mounting/stop member or members attached to the surface of a side member and a clamping member attached to the mounting/stop member(s). In an embodiment wherein the side connector base is in the form of a triangle, the frictional slots are preferably positioned on the side member in the hypotenuse orientation. In this embodiment, the thickness of the mounting/stop member(s) is approximately the same thickness of the spanning board and having sufficient clearance for the spanning board to be placed in the slot from the top. In this embodiment, the mounting/stop and/or clamping members are detachably fastened to the side member, for example by bolts, screws and the like, in a manner to clamp the spanning board in the frictional slot. The mounting/stop and clamping members can be any suitable combination of form and material, such as planks, boards, metal tubes or plates, rubber or plastic.

In another embodiment, the frictional slots or the backside stops/mounting member(s) can be formed by being built right into a side member (in triangle form, the hypotenuse side) through injection molding, welded, formed, or other manners.

In another embodiment, the frictional slots can be formed by a single member, such as a molded piece of plastic, formed, welded or extruded metal, detachably clamped to a side member (in triangle form, the hypotenuse side) by bolts or other manners which can be tightened after the spanning boards have been inserted into the frictional slots.

In any embodiment, the side connector allows the horizontally positioned spanning board or boards to stand firmly upright and evenly, vertically stacked once inserted in the frictional slots.

The stabilizing footprint of the corner connector and side connector enables the connectors and spanning boards to be installed free-standing and without the need for ground securing stakes and the like. This feature facilitates easy installation of the playing area even when the ground is frozen. Furthermore, layout spacing may be easily adjusted to any length of spanning board since the connectors can be moved around and placed as needed during assembly. In a further embodiment, the stabilizing footprint base is designed to facilitate efficient storage and handling when not in use. Since additional connecting hardware is not needed, assembly times are quicker than with prior art systems and uneven areas of the ground are readily accommodated by the free-standing nature of the stabilizing footprint base.

The modular rink system can be constructed from a plurality of corner connectors, side connectors, and spanning boards in a number of desired configurations. In an embodiment, at one end of the modular rink system a first corner connector is attached to a first side connector by a set of vertically stacked spanning boards and the first side connector is attached to a second corner connector by another set of vertically stacked spanning boards. At the other end of the modular rink system a third corner connector is attached to a second side connector by a set of vertically stacked spanning boards and the second side connector is attached to a fourth corner connector by a set of vertically stacked spanning boards. The first corner connector is joined to the third corner connector through a desired number of similar spanning board-side connector-spanning board segments. Similarly, the second corner connector is joined to the fourth corner connector through the same number of spanning board-side connector-spanning board segments that joins the first and third corner connectors. Spanning board lumber is commercially available in standard sizes of 2"×12" and 2"×10" in various lengths ranging from 8' to 16', and so on. The frictional slot could also be sized to accommodate plywood and other suitable materials. Further, the space between the "stop" side of the frictional slot and the nearest corner of the connector base side receiving incoming spanning boards will contribute length to wall segments. For example, a 1 foot space between the "stop" sides of frictional slots on a side connector bracket will contribute 1 foot to the length of the wall segment. In an embodiment, a set of horizontally positioned vertically stacked spanning boards can measure to a height of at least two feet above the ground. Such a height accounts for variations in ground slope to provide sufficient side board surfaces above the water/ice line. The spanning boards can be made from any suitable material, such as, wood, plastic, metal, composites, rubber, and the like.

The modular system may be turned into an ice rink by covering the playing area with a water barrier, such as a large plastic sheet. The water barrier can be placed on the ground and extended to the base of the side walls, up along the walls and over the top of the walls. The water barrier can be secured to the side walls, preferably with clips, staples, tape, and the like. Optionally, the water barrier can be secured to the side walls by a plurality of surface boards placed around the rink. Preferably, the surface boards are placed in slight overlapping end to end fashion around the rink. The surface board is preferably a rectangular plastic board or other suitable material equipped with several brackets having an L-shape extending from the surface of the board and positioned adjacent an upper end thereof. The opening of the bracket is the approximate size of the thickness of the side wall, which allows the surface board to be easily placed on and firmly rest on top of the side walls and hang over the interior of the side walls. The water barrier is held in place sandwiched between the side wall and the surface board. The surface board protects the water barrier from rips, holes, or tears via skates, pucks, and shovels and provides an interior wall playing surface. No attachment with screws, nails, or the like is necessary. The surface board is flexible enough to curve around the corner connector and attach to the spanning boards on either side of the corner connector while providing a smooth angled or curved face so as to round the playing side of the corner. The playing area surface is then filled until covered with water and allowed to freeze. Preferably, the surface board extends below the water line prior to freezing.

In a further embodiment the elements of the side and corner connectors are the same as noted above, however a guide is added for stake insertion to the outside of each corner clamp or frictional slot and there is also a guide in the two front corners of each connector (corner and side connectors) through which stakes can also be inserted. The corner clamps have added 4 screw holes so that top and bottom spanning boards can be secured to corner connectors (and each other). Adding this function prevents any backward slippage or tilting upward of the corner connectors (especially those under the greatest water/ice pressure). Also, these screws connect the spanning boards to each other which provides more weight to combat movement from pressure and in conjunction with the spanning board brace (explained below) helps align the edges of boards and prevent warping. On corner connectors, stakes could be inserted through guide on each corner clamp or frictional slot at a minimum, which will prevent outward movement of spanning boards due to pressure. On side connectors, stakes could be inserted through guides in the two front corners only. The guides could be formed using separate members, or could be incorporated/built into the connector base via injection mold or designed voids. The guides could be of any suitable material such as molded plastic, formed or extruded metal, and the like.

The spanning board brace is a flat, one piece unit designed to be secured to and span across the height of the outside surface of a horizontally positioned spanning board or set of horizontally positioned vertically stacked spanning boards, in the middle of each spanning section (between connectors). The spanning board brace is attached, for example by screws, to top and bottom spanning boards, and includes a guide for stake insertion, which will prevent outward movement of spanning boards due to pressure. The spanning board brace could be formed from any suitable material such as molded plastic, formed or extruded metal, and the like.

Stakes for corner connectors, side connectors and spanning board braces are ideally of strong formed or extruded metal, such as angles or tubes, but could be of another material of suitable strength.

The light/net pole bracket holder (note hole in top and bottom of front crossbars in FIG. 6) can be used for other sports (net for baseball, etc.) as well. The hole(s) for the light/net pole could be formed using separate members as illustrated, or could be incorporated/built into the connector base via injection mold or designed voids.

The invention will be further illustrated with reference to the drawings and more particularly to FIGS. 1-6, thereof. The materials, construction, and proportions set forth in the drawings are by way of example and not meant to limit the scope of the invention disclosed herein. FIG. 1 illustrates a top plan view of an ice rink 1 having elongated spanning boards 2 joining side connectors 4 and corner connectors 6 with water barrier 5.

FIGS. 2A-D illustrate a corner connector 20 including a base 22. The base 22 is formed of three side members joined together end to end in the form of a triangle. Two side members 24 are connected at right angles to each other by side ends 25 and joined to side ends 26 of a hypotenuse side member 27. The triangle base 22 is positioned such that one exposed side end 28 of each side member is in contact with the ground. The corner connector 20 receives the ends of two spanning boards 23 in respective frictional slots 29. The frictional slot 29 is formed by a mounting member 30 attached to the side member 24 and a clamping member 31 attached to the mounting member 30.

FIGS. 3A-D illustrate a side connector 40 including a base 42. The base 42 is formed of three side members joined together end to end in the form of a triangle. Two side members 44 are connected to each other by side ends 45 and joined to side ends 46 of a third side member (hypotenuse) 47. The triangle base 42 is positioned such that one exposed side end 48 of each side member is in contact with the ground. The side connector 40 receives the ends of two spanning boards 23 in each of the respective frictional slots 49. The frictional slot 49 of the side connector 40 is formed by a mounting member 50 attached to the side member 47 and a clamping member 51 attached to the mounting member 50.

Figure 4A:
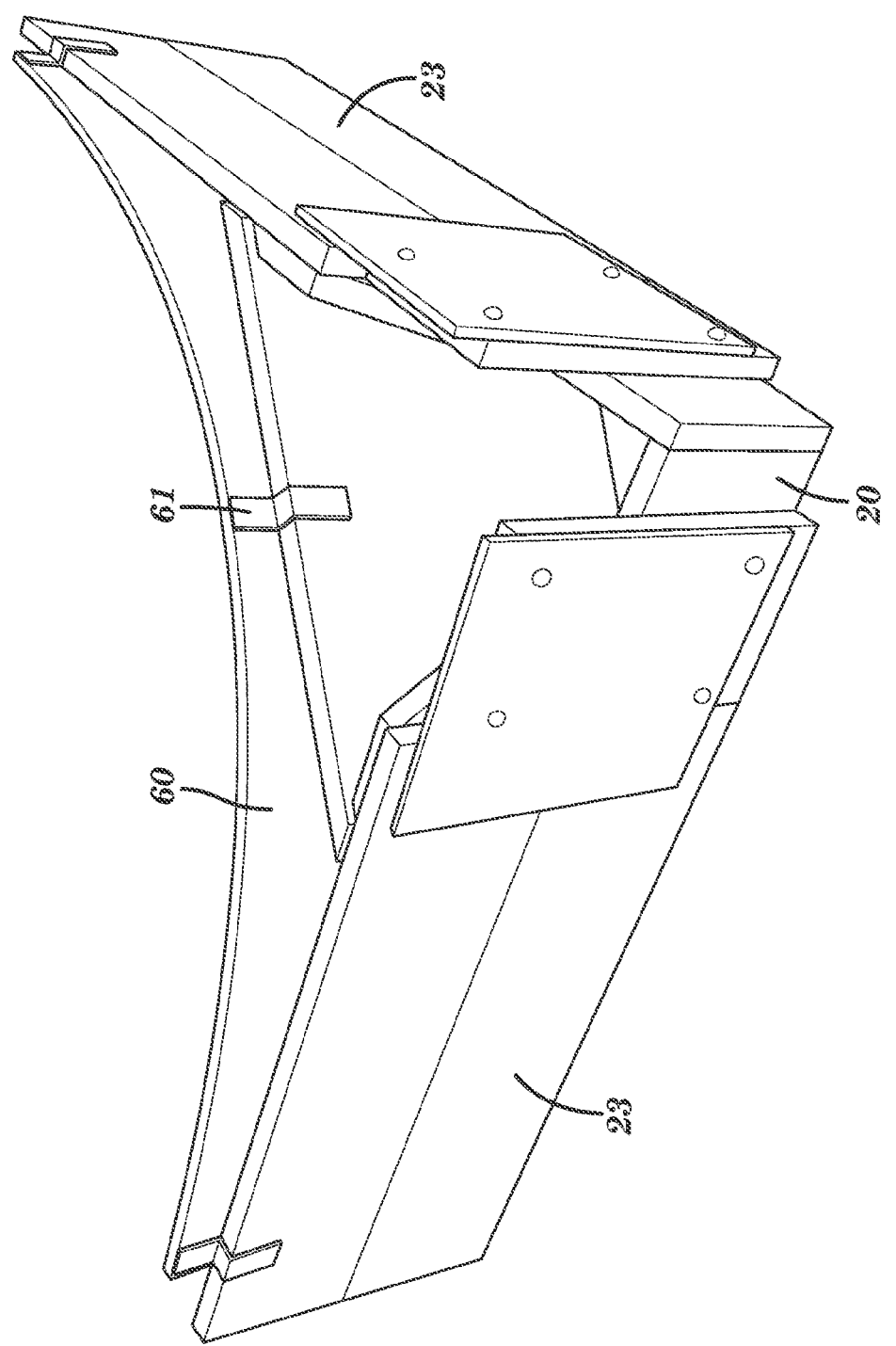
FIG. 4A is a rear perspective view of a corner connector with spanning boards and installed surface board, 4B is a front perspective view of a corner connector with spanning boards and installed surface board, and 4C is a partial perspective view illustrating a surface board installed on a spanning board, in accordance with an embodiment of the present invention.
Figure 4B:
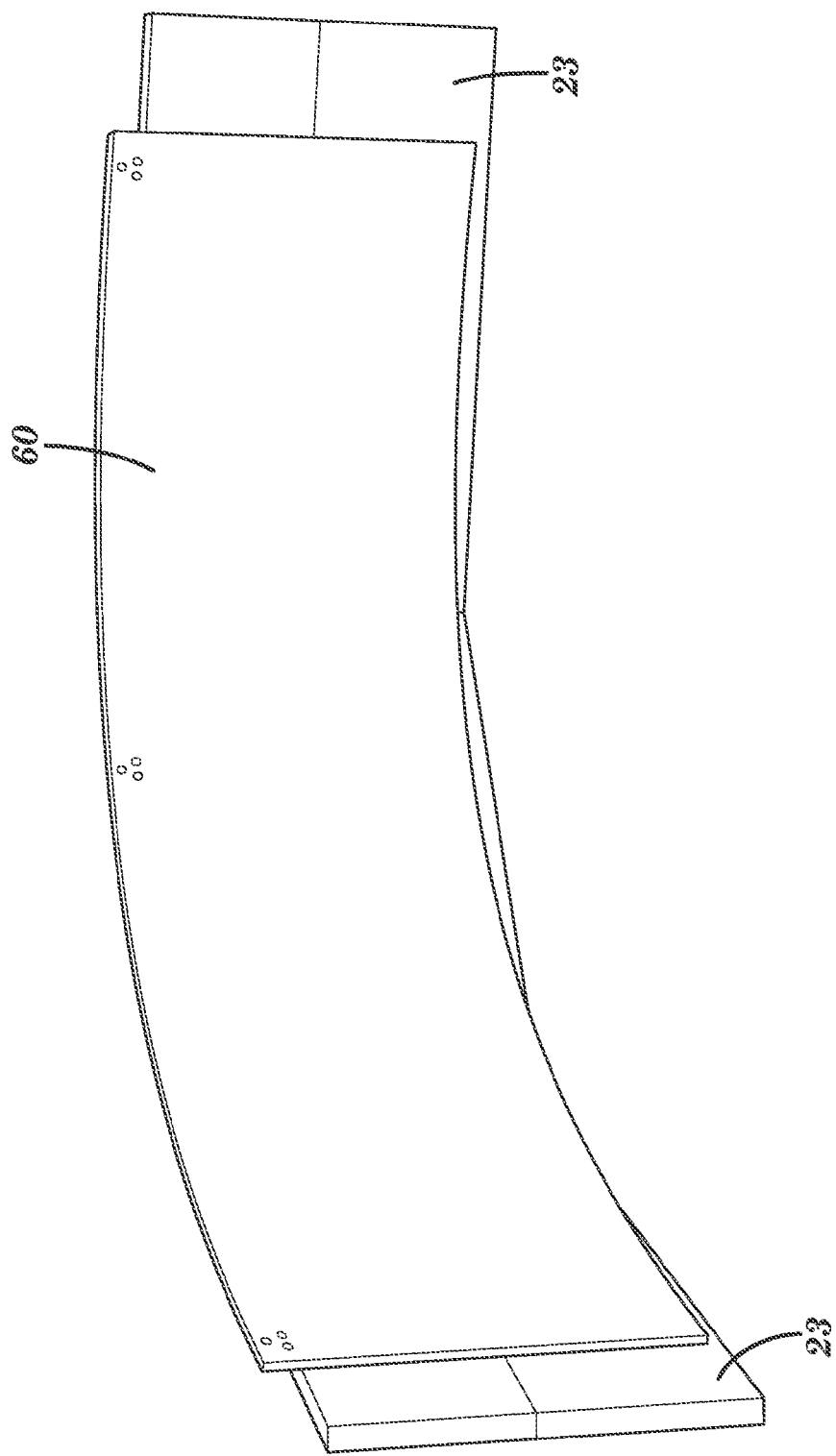

FIGS. 4A-C illustrate an installed a surface board 60. FIGS. 4A and 4B illustrate a surface board 60 installed on spanning boards 23 and a corner connector 20 by a mounting bracket 61. FIG. 4C illustrates the surface board 60 installed on the spanning board 23 by the mounting bracket 61.

Figure 5B:
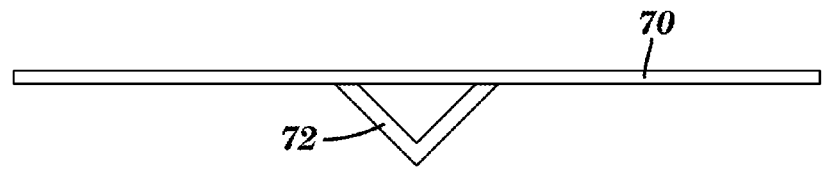
FIG. 5A is a an embodiment of front view and FIG. 5B is a top plan view illustrating a spanning board brace in accordance with an embodiment of the present invention.
Figure 5A:
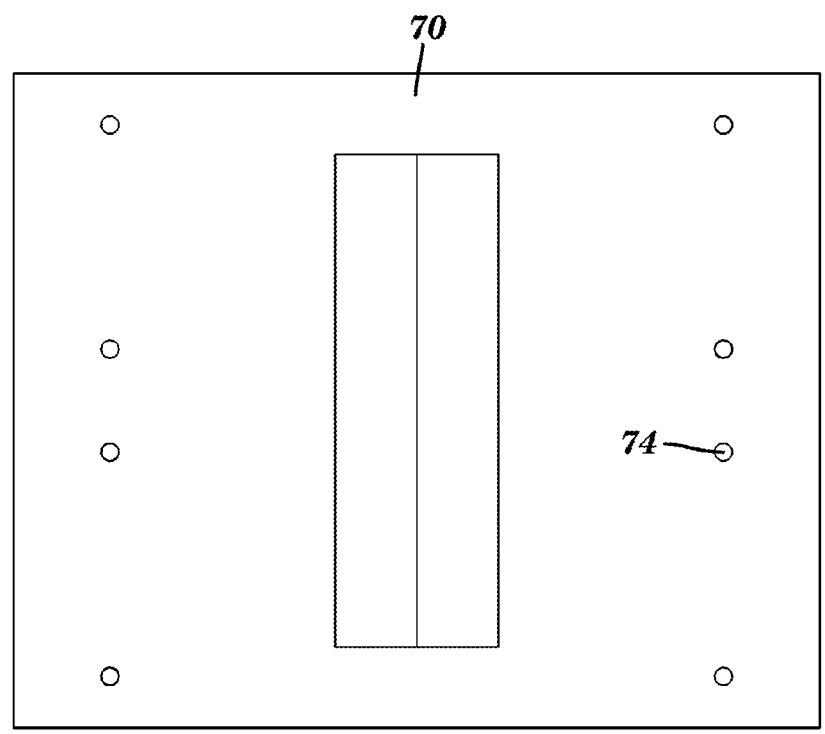

FIGS. 5A-B illustrate a spanning board brace 70 having a guide 72 through which a stake can be inserted into the ground. In this embodiment four (4) holes 74 are provided for screws to secure the bottom spanning board and four (4) holes 74 are provided for screws to secure the top spanning board.

Figure 6:
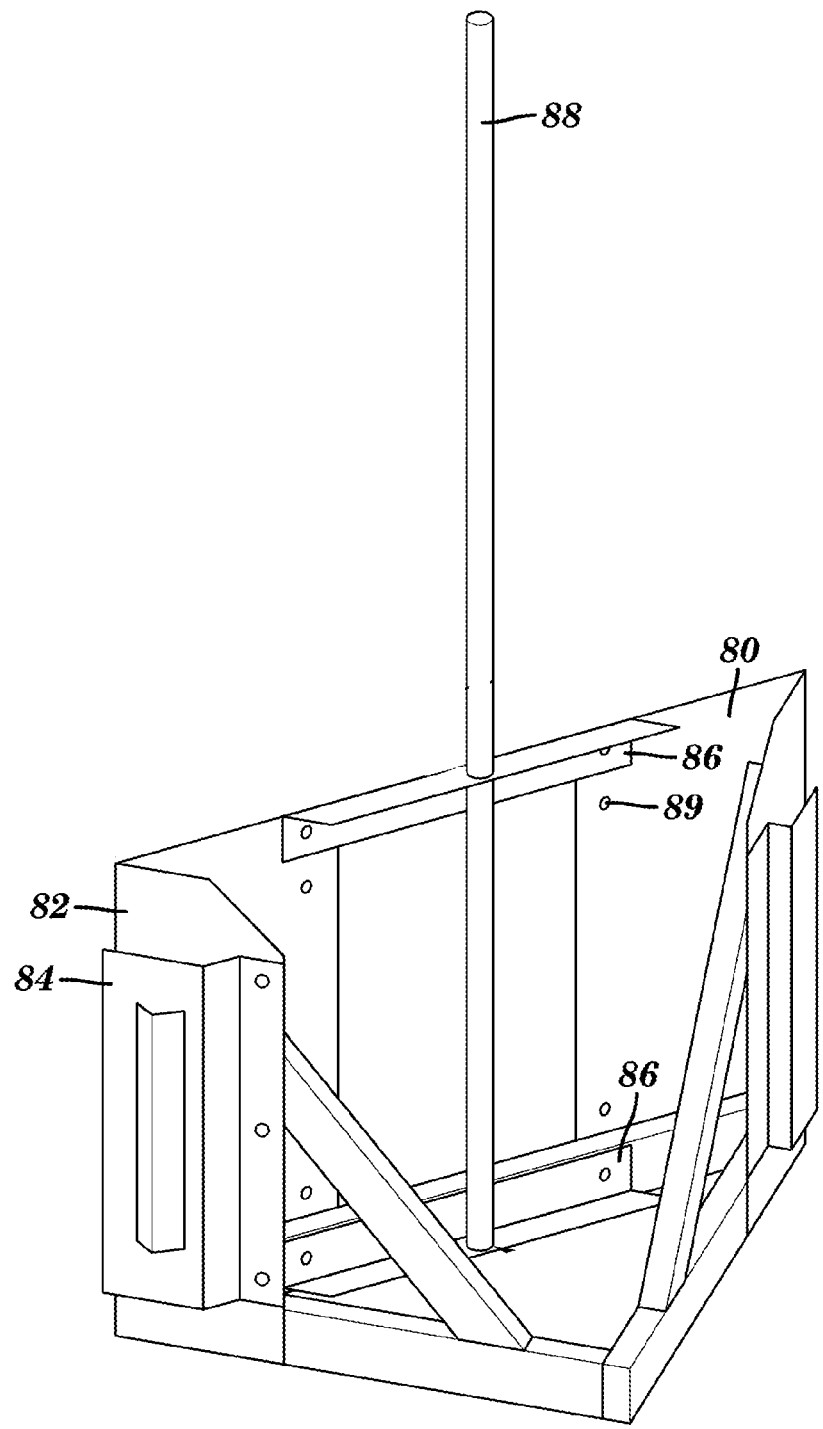
FIG. 6 is a rear perspective view illustrating a corner connector with attached pole in accordance with an embodiment of the present invention.

FIG. 6 illustrates a one-piece corner connector 80 made from, for example, metal or plastic, having a frictional slot 82 formed by a clamping member 84 on each right-angled side. A top pole bracket 86 having a hole for securing a pole 88, for example for a light or net, is shown at the top the corner connector 80 and bottom pole bracket 86 having a hole for securing the pole 88 is shown at the bottom of the corner connector 80. Bolts 89 are shown for securing various components.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:
1. A modular connector system comprising:
four corner connectors, each one of the four corner connectors is adapted to rest directly on the ground and comprise a base having at least three side members, wherein one exposed end of each of the at least three side members is adapted to rest directly on the ground and two of the at least three side members are positioned at approximately right angles to each other and perpendicular to the ground, wherein each of the two side members that are approximately perpendicular to one another comprises a frictional slot perpendicular to the ground, each frictional slot configured to receive an end of a horizontally positioned spanning board or set of horizontally positioned vertically stacked spanning boards that are installed into said frictional slot via the top of the slot so that the spanning board or set of spanning boards in one of the two side member slots is at approximately a right angle to the spanning board or set of spanning boards in the other one of the two side member slots and so that the spanning board, or bottom spanning board in the case of a set of spanning boards, rests directly on the ground; and
at least two side connectors, each one of the at least two side connectors is adapted to rest directly on the ground and comprise a base having at least three side members, wherein one exposed end of each of the at least three side members is adapted to rest directly on the ground and one side member of the at least three side members is perpendicular to the ground, wherein the side member comprises two frictional slots along a substantially linear path to one another and perpendicular to the ground, each of the frictional slots having an end open to the ground and configured to receive an end of a horizontally positioned spanning board or set of horizontally positioned vertically stacked spanning boards that are installed into said frictional slot via the top of the slot so that the spanning board or set of spanning boards in one of the two side member slots is positioned along a substantially linear path to the spanning board or set of spanning boards in the other one of the two side member slots and so that the spanning board, or bottom spanning board in the case of a set of spanning boards, rests directly on the ground;

wherein at least two separate pairs of corner connectors are joined to each other by at least one of a spanning board-side connector-spanning board segment to form an enclosed area.

2. The modular connector system of claim 1, further comprising a water barrier covering a playing area in the interior for construction of an ice rink.

3. The modular connector system of claim 2, wherein the water barrier overlaps the top of the spanning boards of the rink and is secured to the spanning boards by a plurality of surface boards comprising brackets extending from the surface of the surface board and positioned adjacent an upper end thereof placed on top of the spanning boards around the rink.

4. The modular connector system of claim 1, wherein at least one of the four corner connectors or at least one of the at least two side connectors further comprises an insertion hole for a light pole, net pole or a pole for a light and net.

5. The modular connector system of claim 1, wherein at least one corner or side connector further comprises a guide for stake insertion.

6. The modular connector system of claim 1, further comprising a spanning board brace positioned between two connectors.

7. The modular connector system of claim 6, wherein each spanning board brace further comprises a guide for stake insertion.

8. A corner connector comprising a base having a stabilizing footprint which enables the corner connector to rest securely on the ground, the base comprising at least three side members, wherein one exposed end of each of the at least three side members is adapted to rest directly on the ground and two of the at least three side members perpendicular to the ground are positioned at approximately a right angles, each of the two side members having a vertical frictional slot configured to receive an end of a horizontally positioned spanning board or ends of a set of horizontally positioned vertically stacked spanning boards that are installed into said frictional slot via the top of the slot so that the spanning board or set of spanning boards in one of the two side member slots is at approximately a right angle to the spanning board or set of spanning boards in the other one of the two side member slots and so that the spanning board, or bottom spanning board in the case of a set of spanning boards, rests directly on the ground.

9. The corner connector of claim 8, further comprising an insertion hole for a light pole, net pole or a pole for a light and net.

10. The corner connector of claim 8, further comprising a guide for stake insertion.

11. A side connector comprising a base having a stabilizing footprint which enables the side connector to rest securely on the ground, the base comprising at least three side members, wherein one exposed end of each of the at least three side members is adapted to rest directly on the ground and one side member of the at least three side members is perpendicular to the ground, wherein the side member comprises two frictional slots along a substantially linear path to one another and perpendicular to the ground, each of the frictional slots having an end open to the ground and configured to receive an end of a horizontally positioned spanning board or set of horizontally positioned vertically stacked spanning boards that are installed into said frictional slot via the top of the slot so that the spanning board or set of spanning boards in one of the two side member slots is positioned along a substantially linear path to the spanning board or set of spanning boards in the other one of the two side member slots and so that the spanning board, or bottom spanning board in the case of a set of spanning boards, rests directly on the ground.

12. The side connector of claim 11, further comprising an insertion hole for a light pole, net pole or a pole for a light and net.

13. The side connector of claim 11, further comprising a guide for stake insertion.

* * * * *

UNITED STATES PATENT AND TRADEMARK OFFICE
CERTIFICATE OF CORRECTION

PATENT NO.        : 9,833,689 B2
APPLICATION NO.   : 14/540659
DATED             : December 5, 2017
INVENTOR(S)       : Jeffrey T. Smith Page 1 of 1

It is certified that error appears in the above-identified patent and that said Letters Patent is hereby corrected as shown below:

In the Claims

Column 9, Line 37 in Claim 8, the word "angles" should be --angle--

Signed and Sealed this
Seventh Day of April, 2020

Andrei Iancu
*Director of the United States Patent and Trademark Office*